United States Patent Office 3,652,449
Patented Mar. 28, 1972

3,652,449
HYDROCARBON CONVERSION PROCESSES USING ALUMINA-BONDED CATALYSTS
Dean Arthur Young and Grant A. Mickelson, Yorba Linda, Calif., assignors to Union Oil Company of California, Los Angeles, Calif.
No Drawing. Continuation-in-part of application Ser. No. 713,993, Mar. 18, 1968, now Patent No. 3,557,024. This application June 24, 1970, Ser. No. 49,584
Int. Cl. C10g 13/02, 23/00
U.S. Cl. 208—111
17 Claims

ABSTRACT OF THE DISCLOSURE

Hydrocarbon conversion processes, e.g., hydrocracking, hydrofining and the like, use highly stable catalysts prepared from siliceous materials such as aluminosilicate zeolites employing acid-treated boehmite alumina as a binder. The boehmite alumina is treated with at least 0.5 equivalent of acid per mole of boehmite. The acid employed in the treatment is a mineral acid having a monovalent anion or a salt thereof, e.g., nitric acid, hydrochloric acid or their salts. These catalysts find utility in processes such as cracking, hydrocracking, hydrotreating, isomerization and the like. The binder composition comprising the acid-treated boehmite may also be used for binding a variety of siliceous compositions such as amorphous combinations of silica and alumina, activated clays and silica gel.

DESCRIPTION OF THE INVENTION

This application is a continuation-in-part of our co-pending application Ser. No. 713,993, filed Mar. 18, 1968, now U.S. Pat. No. 3,557,024.

Crystalline aluminosilicate zeolites are conventionally used as catalysts or catalyst supports for a variety of catalytic reactions, such as hydrocarbon conversion reactions. These crystalline materials are, however, finely divided when initially prepared and must be formed into agglomerates by processes such as extruding, molding, casting, etc. In addition, a suitable binding agent is usually essential to impart sufficient strength to the resulting aggregates.

In general, any catalyst having a crushing strength less than about 7 pounds will have limited usefulness in large scale equipment due to the packing weight in tall columns. The present invention is directed to the preparation and use of an improved binding agent comprising acid-treated boehmite. This binding agent enables the preparation of a zeolite composition that is readily amenable to extrusion, pelleting, molding, casting, etc. and results in a product having a greatly improved crushing strength. The commensurate improvements in physical strength of the resulting composite are reflected in the durability of the catalyst in a processing unit and prolonged catalyst life.

In accordance with the invention it has been found that the type of alumina and the amount of acid are critical in obtaining a product of high crushing strength. In addition, it has been found that strong acids, i.e., mineral acids, are superior to the weaker acids, such as organic acids.

The use of alumina as a binder for zeolites and other siliceous materials is conventional and is disclosed, e.g., in U.S. Pat. Nos. 2,865,867, 3,173,855 and 3,326,818. However, the prior art procedures have generally resulted in products having one or more deficiencies such as low crushing strength, low zeolite content, limitation to certain types of zeolites, etc. It has now been found that the use of the boehmite form of alumina is essential to obtaining products having the desired high crushing strength, superior physical stability, high zeolite content and applicability to a wide variety of zeolites and other siliceous materials. The presence of even minor amounts of other forms of alumina, such as bayerite, has an adverse effect on the quality of the product, particularly on its crushing strength.

In addition it has now been found that the use of at least 0.5 equivalent of acid per mole of boehmite is essential to obtaining a product of high crushing strength. Amounts of acid up to about 2 equivalents per mole of boehmite are generally satisfactory; however, a maximum of about 1 equivalent per mole of boehmite is usually preferable. Within these limits the optimum amount of acid may vary considerably, depending on the type of acid and siliceous material, amount of binder and intended use of the aggregate.

Boehmite is, of course, a conventional material and can be prepared by a variety of processes, as exemplified by the following procedures:

(1) Thermally decompose aluminum nitrate or chloride in air at 200 to 600° C. Rehydrating the decomposition product in hot ammonium hydroxide forms a boehmite with excellent bonding properties.

(2) Add alum or an aluminum salt to excess ammonium hydroxide at temperatures above 60° C. The reaction product should be kept hot during washing and drying to avoid the conversion of boehmite to bayerite. The boehmite is stabilized either by drying or the addition of an acidifying agent.

(3) Add alum or an aluminum salt to sodium hydroxide or carbonate at temperatures above 80° C. The resulting boehmite must be dried hot or acidified to avoid recrystallization.

(4) React sodium aluminate with alum or an aluminum salt according to the above procedure.

(5) React sodium aluminate with an acid to give about pH 9 above 80° C.; then dry or acidify as described previously.

The boehmite may be either a freshly prepared filter cake or a dried powder, provided the drying temperature does not exceed 250° C. These materials characteristically have particle sizes of about 0.2 to 10 microns, surface areas of about 50 to 300 square meters per gram and water contents of about 15 to 80 wt. percent. They are also characterized by positively charged surfaces. Accordingly, they may also contain other materials having surface charge characteristics that are compatible with this positive character of the surfaces. Examples of such materials are nickel or cobalt nitrate or oxide, chromic chloride, etc.

The acidifying agents employed in treating the boehmite are acidic inorganic compounds, particularly mineral acids, containing monovalent anions or acidic salts of such acids. Examples are nitric acid, hydrochloric acid, perchloric acid, aluminum nitrate, aluminum chloride, zirconyl chloride, chromic chloride, ferric chloride, etc. Preferred acidifying agents are nitric and hydrochloric acids and their aluminum salts.

The acidified boehmite should contain from about 40 to 85 percent by weight of water before mixing with the material to be bonded. Thus, if the combined total of water contents of the boehmite and the acidifying agent does not fall within this range, sufficient water should be added to provide the required amount of total water.

The acidifying agent and water should be sufficiently thoroughly dispersed in the boehmite to obtain an even consistency. Mullers, kneaders or blenders may be used to combine the boehmite with the acidifying agent and water to obtain such a dispersion. Heating or injection of steam also aids in producing a suitable combination. The pH of the resulting mixture should be between about 2.0 and 5.0. The preferred pH range is 2.5 to 3.0 with a water content of 60 to 75 percent.

Crystalline aluminosilicate zeolites are conventional and include the natural zeolites, faujasite, mordenite, erionite and chabazite and synthetic zeolites A, L, S, T, X and Y. Zeolites X, Y and L are described in U.S. Pats. 2,882,244, 3,130,007 and 3,216,789. These crystalline zeolites are metal-aluminosilicates having a crystalline structure such that a relatively large adsorption area is present inside each crystal. They consist basically of three-dimensional frameworks of $SiO_4$ and $AlO_4$ tetrahedra with the tetrahedra cross-linked by the sharing of oxygen atoms. The electrovalence of the tetrahedra containing aluminum is balanced by the inclusion of the crystal of cations, for example, metal ions, ammonium ions, amine complexes, or hydrogen ions. The spaces in the pores may be occupied by water or other adsorbate molecules.

Normally, the crystalline zeolites occur, or are prepared in the sodium or potassium form. The ammonium form of the zeolite is prepared by ion exchange of the sodium or potassium form with an ammonium salt to replace most or all of the sodium or potassium. This procedure for preparation of the ammonium form of zeolite is also conventional and is described in U.S. Pat. No. 3,130,006.

The zeolite catalysts also conventionally contain a wide variety of catalytically active metals or compounds thereof, depending on the process in which the catalyst is to be used. Examples are the metals of Groups II, IV to VI and VIII of the Periodic Table, or compounds thereof. These metals are incorporated into the zeolite by conventional means such as adsorption or ion-exchange from aqueous solution, mulling or grinding, vapor deposition, etc.

The concentrations of these active components in the finished catalyst can vary considerably depending upon the activity and selectivity desired, the conditions at which they are to be employed, and the nature of the active metal or metal compound. As a general rule, the metals, oxides and sulfides of Group VI, particularly molybdenum and tungsten and Group VIII, particularly nickel, cobalt, platinum, and palladium, are the major active constituents. The concentration of the Group VI metal constituent is usually within the range of about 8 to about 30 weight percent, preferably about 12 to about 20 wt. percent based on the corresponding oxide. The concentration of the Group VIII metal constituent will depend much more upon the nature of the selected metal. For example, the concentration of the iron group metal component is generally within the range of about 1 to about 12 wt. percent based on the corresponding oxide. In contrast, when the noble metals are employed, their concentration will usually be much lower at about 0.2 to about 5 wt. percent calculated as the free metal.

Similarly, the relatively binder concentration can also vary over a broad range. The concentration of this constituent will depend on the amount of binder required to form a physically stable composite and, in some instances, will depend on the degree of cracking activity desired in the support. For example, at times it is desirable to employ only very minor amounts of highly active aluminosilicates in such catalysts. Consequently, the concentration of binder or other filler would be relatively high. Consequently the binder concentration will usually range from about 5 to about 80 wt. percent, preferably about 10 to about 50 wt. percent on a dry weight basis.

Although the binder composition of the present invention has been found particularly effective in preparation of zeolite-base catalysts, it is also effective in binding of other siliceous materials that may have uses other than as catalysts, e.g. adsorbents, filters, ceramics, etc. Examples of such siliceous materials are amorphous combinations of silica and alumina, activated clays, silica gel, silica-zirconia, silica-magnesia, etc. These materials may also be in an essentially pure state or combined with the metals of Groups IV to VIII. For example, the amorphous combinations of silica and alumina can be prepared by coprecipitation of silica and alumina from their respective water soluble salts in an aqueous solution. Exemplary of salts which are suitable for this purpose are the alkali metal silicates and aluminates. In the alternative, individually prepared gels or sols of silica, alumina, zirconia, magnesia and the like can be admixed subsequent to partial or complete gelation by dispersion in an aqueous phase and intimate admixture of the several constituents. It is apparent, however, that more intimate admixture of the several constituents can be accomplished if the gels of either one or more of the components, e.g., silica and alumina, have not completely set prior to admixture so that the respective gels or sols are relatively dispersible. A further advantage that results from admixture of the gels prior to complete gelation is that further reaction of the gel matrix can take place with the other constituents of the mixture such as by reaction between silica and alumina to form a more coherent combination of the two constituents.

As a general rule the concentration of silica in these combinations of silica and the other matrix materials above mentioned is at least about 20 weight percent, usually within the range of about 30 to about 90 weight percent, on a dry weight basis. The co-gels, aluminosilicates, etc., having relatively high silica concentrations, e.g., in excess of 50 weight percent, are generally much more difficult to bond with conventional bonding agents. It is therefore with these combinations that the advantages of the bonding agents of this invention are most dramatic.

As previously mentioned, the compositions of this invention can be employed to effect a wide variety of hydrocarbon conversions on hydrocarbon feeds of vastly different characteristics. For example, these catalysts, preferably containing hydrocracking and hydrogenation components, can be employed to convert heavy naphthas, gas oils, vacuum gas oils, vacuum distillates and the like to either gasoline range hydrocarbons or midbarrel fuels. Of course, when the production of midbarrel fuels is preferred, the heavier boiling feeds, i.e., feeds boiling generally over 650° F., should be employed. The most effective hydrocracking catalysts for the production of gasoline are those containing a substantial proportion, i.e., at least about 3 weight percent, of an aluminosilicate based on the total weight of the final catalyst. However, the aluminosilicate concentration in such gasoline producing catalysts is generally within the range of about 40 to about 70 weight percent on a dry weight basis. On the other hand, however, the catalysts composed of foraminous refractory oxides such as cogels of silica and alumina, silica, zirconia and the like, generally having cracking activity indices below about 25, are preferred for the production of higher boiling midbarrel fuels. For example, the nickel and molybdenum-containing silica-alumina cogel catalyst prepared as described in Examples 8 and 9, infra, are particularly attractive for the production of midbarrel fuels. However, other active metal combinations such as nickel-tungsten, nickel-cobalt-molybdenum, cobalt-tungsten, and the like can be employed in the prepartion of both gasoline and midbarrel hydrocracking catalysts.

These compositions, particularly the amorphous foraminous refractory oxides, such as silica-alumina and silica zirconia cogel based catalysts described in Examples 8 and 9 are also particularly suitable for hydrofining, e.g., denitrogenating and desulfurizing raw or partially refined hydrocarbon feedstocks of greatly variant characteristics. For example, these catalysts can be employed to hydrofinish light naphthas having initial boiling points of 150° F. or, at the other extreme, residual oils boiling over 1000° F. Illustrative of the application of such hydrofinishing operations are the denitrogenation and desulfurization of hydrocracker and reformer feedstocks.

Depending upon the characteristics of the feedstock employed, the conditions generally involved in hydrocracking include temperatures within the range of 500 to about 900° F., preferably 600 to about 850° F., liquid hourly space velocities (LHSV) within the range of about 0.1 to about 10, preferably about 0.3 to about 5, total reactor pressures within the range of about 1500 to 3000 p.s.i.g., preferably 1800 to 2500 p.s.i.g., and hydrogen rates based on total reactor feed of at least about 500 and preferably about 3000 to about 15,000 standard cubic feed per barrel.

Hydrofining of these feedstocks, i.e., conversion of the organonitrogen and organosulfur compounds to ammonia and hydrogen sulfide respectively, can also be effected at these same conditions. However, it is often desirable to effect a substantial degree of hydrofining in the absence of substantial hydrocracking. In such situations it may be desirable to reduce the hydrogen partial pressure and reactor temperature employed during hydrofining. Liquid hourly space velocities employed in hydrofining operations are also generally somewhat higher that those employed in hydrocracking.

The following examples will serve to more particularly illustrate the invention and its advantages.

EXAMPLE 1

This example illustrates the adverse effect of the presence of an alumina other than boehmite, i.e., bayerite, and the use of insufficient acid. A catalyst was prepared according to the following procedure:

A 260 g. portion of Harshaw AL–1402P alumina, a spray dried alumina powder containing 23.1% water and composed of 94% boehmite and 5% bayerite, was mulled with 57 ml. water and 38 ml. concentrated nitric acid until the mixture had an even consistency. Calcining a sample at 650° C. showed 46.5% volatile matter. A sample was dispersed in water to determine the acidity. The pH was 3.2 and titration to a phenophthalein endpoint indicated 0.29 equivalent of acid per mole of anhydrous alumina.

A 125 g. portion of the acidified paste was used to add 20% $Al_2O_3$ to the following mulled mixture: A 200 g. portion of 700° C. precalcined cobalt zeolite Y was mulled for 10 minutes with 65 g. $Ni(NO_3)_2 \cdot 6H_2O$ crystals. Then 61 g. of solid $(NH_4)_6Mo_7O_{24} \cdot 4H_2O$ was added and the mulling continued until the powder was uniform. Finally the 125 g. portion of binder was mulled in and sufficient water added to form an extraduable paste. The final mixture contained 47.2% volatiles at 650° C. Dispersing a portion in distilled water gave 4.9 pH.

The mulled paste was transferred to a cylinder equipped with a hydraulic piston and die for making ⅛-inch extrudate. During the extrusion the hydraulic pressure gradually increased from 300 to about 1000 p.s.i., and the extrudate became watery and finally stopped. Additional pressure only caused water to separate from a rock-like mass which formed in the cylinder. The small quantity of extrudate was aged in a water-saturated atmosphere 2 hours at 140° F. and 2 hours at 200° C., and then dried in steam 2 hours at 240° F. and 2 hours at 280° F. Then the pellets were heated from 400 to 850° F. in circulating air in a rotary calciner. Crushing strength was determined by measuring the force required to break the pellets when they were pressed against a 0.10-inch diameter rod. The average for 20 pellets was 2.4 pounds.

EXAMPLE 2

This example shows that an increase in the amount of acid results in an appreciable improvement in ease of preparation and crushing strength of the catalyst.

A 260 g. portion of Harshaw AL–1402P alumina was mulled with 377 ml. water and 76 ml. concentrated nitric acid. Calcination showed 73.3% volatile matter. The acidity was 0.60 equivalent of acid per mole of alumina with pH 3.2. The binder paste was used to add 20% $Al_2O_3$ to a zeolite Y catalyst according to the procedure of Example 1. A 200 g. portion of precalcined cobalt zeolite Y was mulled with 65 g. $Ni(NO_3)_2 \cdot 6H_2O$ and 61 g. $(NH_4)_6Mo_7O_{24} \cdot 4H_2$ as previously. Then a 250 g. portion of the acidified alumina binder was added. Lastly, sufficient water was mulled in to form an extrudable paste. The final mixture was 3.6 pH and contained 48.3% volatile matter. The paste was charged to the previously described extruder and readily formed ¹⁄₁₆-inch extrudate. The resulting pellets were dried and calcined as previously. The average crushing strength of 20 pellets was 6.2 pounds.

EXAMPLE 3

This example shows the adverse effect of insufficient acid on crushing strength, even when pure boehmite is used.

Boehmite alumina was prepared as follows: A solution of ammonium hydroxide was prepared by mixing 6.5 liters of 28% aqueous ammonia with 6.5 liters water. The solution was heated to 65° C. prior to adding 6.9 kg. of alum crystals. The resulting slurry was kept at 60–65° C. during filtration and washing to remove the sulfate salt. The hot filter cake was immediately transferred to an oven, dried, and then ground to powder. Differential thermal analysis indicated that the alumina product was pure boehmite. A 258 g. portion of the dried boehmite was mulled with 38 ml. concentrated nitric acid and 59 ml. water. This binder mixture was 3.4 pH, 44.1% volatiles, and contained 0.27 equivalent of acid per mole of alumina.

Precalcined cobalt zeolite Y, nickel nitrate and ammonium heptamolybdate were combined according to the procedure and quantities used in Example 2.

Then a 119 g. portion of the binder was added to the muller to provide 20% $Al_2O_3$ in the final mixture. Sufficient water was added to form an extrudable paste. The final mixture contained 45.0% volatiles and the pH was 5.1. This combination readily extruded, in contrast to that of Example 1, and the crushing strength of the dried calcined pellets was 3.5 pounds.

EXAMPLE 4

This example shows that crushing strength is further improved when pure boehmite and sufficient acid are used.

A sample of pure boehmite alumina powder, Harshaw AL–XL 3263–4–2P, was mulled with water and concentrated nitric acid to form a paste which contained 68.7% volatiles, contained 0.58 equivalent acid per mole of alumina and had 3.0 pH.

Precalcined cobalt zeolite Y, nickel nitrate and ammonium heptamolybdate were mulled together according to the procedure and quantities used in Example 2.

A 214 g. portion of the boehmite paste was added, followed by sufficient water to form an extrudable mixture. The final volatiles was 44.2% and the pH was 4.0. Pellets were extruded, dried, and calcined as previously. The crushing strength was 7.4 pounds.

EXAMPLE 5

This example shows that a further increase in the amount to acid, to 0.8 equivalent per mole of boehmite, results in further substantial improvement in crushing strength.

A sample of boehmite, prepared by thermally decomposing aluminum chloride in air, was mixed with water and concentrated nitric acid to form a paste which contained 80.8% volatiles and 0.80 equivalent of acid per mole of alumina.

Precalcined zeolite Y, nickel nitrate, and ammonium heptamolybdate were combined according to the procedure of Example 2.

Then a 334 g. portion of the binder paste was added to provide 20% $Al_2O_3$. No additional water was required to form an extrudable paste. The final mixture contained 54.9% volatiles, and the pH was 4.2. Pellets were extruded, dried, and calcined as previously. The crushing strength was 12.5 pounds.

EXAMPLE 6

This example shows that the crushing strength is substantially increased with increase in the amount of acid, even though a buffer, $NiCO_3$, is incorporated in the zeolite composition.

A portion of the boehmite alumina described in Example 3 was mulled with concentrated nitric acid and water to form a binder paste which contained 71% volatiles and 0.80 equivalent of nitric acid per mole of alumina. The pH was 3.2.

A 400 g. portion of hydrogen zeolite Y, which had been in 15 p.s.i.a. steam at 1200° F. for 24 hours, was mulled for 20 minutes with 21.3 g. $NiCO_3$ and 82 g. $Ni(NO_3)_2 \cdot 6H_2O$. Then 122 g. $(NH_4)_6Mo_7O_{24} \cdot 4H_2O$ and 67 g. flowers of sulfur were added and mulling continued 10 minutes. Then a 459 g. portion of the alumina paste was added to provide 20% $Al_2O_3$ binder. The final mixture contained 58.9% volatiles and the pH was 3.7. The mixture was extruded, dried, and calcined as described previously, except that the calcination was in a carbon dioxide atmosphere. The crushing strength of the calcined pellets was 11.6 pounds.

EXAMPLE 7

This example shows that addition of the buffer, $NiCO_3$, to the boehmite binder weakens the pellets, whereas addition of the buffer to the zeolite, as in Example 6, does not.

A 400 g. portion of cobalt zeolite Y, which had been calcined at 1300° F., was mulled with 82 g.

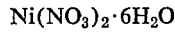
$Ni(NO_3)_2 \cdot 6H_2O$ and 122 g. $(NH_4)_6Mo_7O_{24} \cdot 4H_2O$.

A portion of the boehmite alumina used in Example 5 was mulled with nitric acid and water to form a paste which contained 71.7% volatiles and 0.80 equivalent of acid per mole of alumina. The binder was heated to 90° C. and digested for several hours. Then 21.3 g. nickel carbonate was added to a 444 g. portion.

The nickel-containing binder was then mulled with the catalyst mixture. Sufficient water was added to form an extrudable paste. The final mixture contained 49.4% volatiles, and the pH was 4.1. The paste was extruded, dried and calcined according to the procedure of Example 5. The crushing strength of the calcined pellets was 5.0 pounds.

EXAMPLE 8

This example illustrates the manner in which the binders of this invention can be employed in preparing extrudates of a silica-alumina cogel containing 60 weight percent silica on a dry weight basis. The silica-alumina cogel can be prepared by admixing two aqueous solutions of sodium silicate and sodium aluminate containing about 10 weight percent sodium silicate and about 5 weight percent sodium aluminate respectively. These solutions are admixed in proportions sufficient to provide a relative silica concentration in the resultant precipitate of 60 weight percent. The mineral acid, e.g., sulfuric acid, is then added in an amount sufficient to precipitate the silica and alumina within a period of about 30 minutes. The precipitate is then collected by filtration, water washed to remove excess sulfate and dried to reduce the water content thereof to a level below about 40 weight percent. The silica-alumina cogel was then calcined at 700° C. for 4 hours and crushed to render to cogel in powder form. Next 200 grams of the powder were mulled with 60 grams of solid ammonium heptamolybdate, tetrahydrate and 65 grams of nickel nitrate, hexahydrate crystals. During the continuation of mulling, a sufficient amount of the boehmite alumina prepared as described in Example 4 is added to the muller along with sufficient water to form an extrudable paste. Mulling is continued for at least about 15 minutes to form an intimately dispersed mixture after which the admixed ingredients are extruded and calcined as previously described. The resultant catalyst comprising molybdena and nickel oxide on silica alumina cogel bonded with boehmite alumina can be used as either hydrocracking or hydrofining catalysts.

EXAMPLE 9

A catalyst similar to that described in Example 8 supported on silica zirconia cogel can be prepared by mulling a 200 gram portion of a silica zirconia cogel (containing about 60 weight percent silica on a dry weight basis) with 65 grams of nickel nitrate hexahydrate crystals and about 60 grams of ammonium heptamolybdate, followed by addition of sufficient boehmite alumina prepared as described in Example 4 to provide a final boehmite alumina concentration of 20 weight percent on a dry weight basis. Mulling, extrusion and calcination are effected as described in Example 8.

EXAMPLE 10

The application of the compositions of this invention to the conversion of hydrocarbons is illustrated by this example. A hydrofined gas oil boiling between 550 and 950° F. can be contacted with the composition prepared in accordance with Example 4 at a temperature of 720° F., a total reactor pressure of 1900 p.s.i.g., liquid hourly space velocity (LHSV) of 0.5 and hydrogen rate of 8000 standard cubic feet of hydrogen per barrel of feed to the reactor on a once-through basis to convert a substantial proportion of the hydrocarbon feed to gasoline and midbarrel fuels.

EXAMPLE 11

This example illustrates the manner in which the compositions of this invention, particularly the composition of Examples 8 and 9, can be employed to convert relatively high boiling hydrocarbon mixtures to midbarrel fuels. A vacuum distillate boiling between 650 and 1050° F. can be contacted with the composition prepared in accordance with Example 8 at a temperature of about 760° F., a liquid hourly space velocity of 0.5 at a total reactor pressure of 2250 p.s.i.g. in the presence of hydrogen added at a rate of about 8000 standard cubic feet per barrel of feed to convert a substantial proportion thereof to midbarrel fuels boiling below 650° F.

We claim:

1. The method converting hydrocarbons which comprises contacting said hydrocarbon under hydrocarbon conversion conditions with the composition which forms oin intimately admixing a siliceous base with a binder consisting essentially of hydrous boehmite alumina acidified with at least 0.5 equivalent per mole of said alumina of a strong mineral acid having a monovalent anion or an acidic salt thereof and drying the resultant combination.

2. The method of claim 1 wherein said hydrocarbon boils above about 200° F. and is contacted with said composition at a temperature within the range of about 500 to about 900° F. at a liquid hourly space velocity within the range of about 0.1 to about 10 at a pressure of up to about 3000 p.s.i.g. in the presence of at least about 500 standard cubic feet of hydrogen per barrel of said hydrocarbon.

3. The method of claim 1 wherein said siliceous base is selected from crystalline and amorphous silicas, silica-alumina combinations and aluminosilicates and said boehmite alumina consists of less than about 5 weight percent bayerite on a dry weight basis and is prepared by acidifying hydrous boehmite alumina with 0.5 to about 2 equivalents per mole of said alumina of at least one of nitric acid, hydrochloric acid, perchloric acid, aluminum nitrate, aluminum chloride, zirconyl chloride, chromic chloride and ferric chloride, said hydrocarbon feed boils about 200° F. and is contacted with said composition at a temperature within the range of 500 to 900° F., a liquid hourly space velocity within the range of 0.1 to about 10 at a total reactor pressure within the range of 1500 to 3000 p.s.i.g. and hydrogen combined with said hydrocarbon at a rate of at least about 500 standard cubic feet per barrel.

4. The method of claim 1 wherein said binder consists essentially of boehmite alumina containing less than about 5 weight percent bayerite on a dry weight basis acidified with about 0.5 to about 2 equivalents per mole of said alumina of at least one of nitric acid and hydrochloric acid.

5. The method of claim 1 wherein said hydrocarbon boils within the range of about 400 to about 1100° F. and is contacted with said composition at a temperature within the range of about 500 to about 900° F., a liquid space velocity within the range of about 0.1 to about 10 at a total reactor pressure within the range of 1500 to 3000 p.s.i.g. in the presence of hydrogen added to said feed at a rate within the range of about 3000 to about 15,000 standard cubic feet per barrel and said binder consists essentially of boehmite alumina containing less than about 5 weight percent bayerite on a dry weight basis acidified with about 0.5 to about 2 equivalents of at least one of nitric acid and hydrochloric acid per mole of said alumina.

6. The method of claim 1 wherein said siliceous base is a crystalline aluminosilicate zeolite and said composition comprises at least one of the metals, oxides and sulfides of iron, cobalt and nickel and at least one of the oxides, metals and sulfides of molybdenum and tungsten.

7. The method of claim 6 wherein said binder consists essentially of hydrous boehmite alumina containing about 40 to about 85 weight percent water acidified with about 0.5 to about 2 equivalents of at least one of nitric acid and hydrochloric acid.

8. The method of claim 1 wherein said siliceous base is a crystalline aluminosilicate zeolite, said combination contains at least one of the metals, oxides and sulfides of iron, cobalt, nickel, platinum, palladium, molybdenum and tungsten, said binder consists essentially of hydrous boehmite alumina containing about 40 to about 85 weight percent water acidified with about 0.5 to about 2 equivalents of at least one of nitric acid and hydrochloric acid, said hydrocarbon boils within the range of about 400 to about 1100° F. and is contacted with said composition at a temperature within the range of 500 to 900° F. at a liquid hourly space velocity within the range of about 0.1 to about 10 at a total reactor pressure within the range of 1500 to 3000 p.s.i.g. in the presence of about 3000 to about 10,000 standard cubic feet per barrel of hydrogen.

9. The method of claim 1 wherein said binder comprises about 5 to about 60 weight percent of said composition, said composition contains at least one of the metals, oxides and sulfides of iron, cobalt, nickel, platinum, palladium, tungsten and molybdenum, said hydrocarbon boils within the range of 400 to 1100° F. and is contacted with said composition at a temperature within the range of 500 to 900° F. at a liquid hourly space velocity within the range of 0.1 to 10 and a total reactor pressure within the range of 1500 to 3000 p.s.i.g. in the presence of at least 500 standard cubic feet of hydrogen of said hydrocarbon per barrel.

10. The method of hydrocracking hydrocarbons boiling above about 200° F. which comprises contacting said hydrocarbons under hydrocracking conditions with a catalyst comprising a siliceous base having combined therewith at least one of the metals, oxides and sulfides of iron, cobalt, nickel, platinum, palladium, molybdenum and tungsten and about 5 to about 80 weight percent of an acidified boehmite alumina binder, said boehmite alumina binder having been acidified with at least 0.5 equivalent per mole of said alumina of a strong mineral acid having a monovalent anion over an acidic salt thereof prior to combination with said silicous base.

11. The method of claim 10 wherein said siliceous base is selected from crystalline and amorphous silicas, silica-alumina admixtures and aluminosilicates, said boehmite alumina consists of less than about 5 weight percent bayerite on a dry weight basis and is prepared by acidifying hydrous boehmite alumina with about 0.5 to about 2 equivalents per mole of said alumina of at least one of nitric acid, hydrochloric acid, perchloric acid, aluminum nitrate, aluminum chloride, zirconyl chloride, chromic chloride and ferric chloride, the concentration of said binder in said catalyst is within the range of about 10 to about 50 weight percent on a dry weight basis and said hydrocarbon is contacted with said catalyst at a temperature within the range of 500 to 800° F. at a liquid hourly space velocity within the range of about 0.5 to about 10 at a pressure within the range of 500 to 2000 p.s.i.g. in the presence of hydrogen added at the rate of at least about 500 standard cubic feet per barrel of said hydrocarbon.

12. The method of claim 10 wherein said catalyst comprises catalytically active amounts of nickel and molybdenum in the form of at least one of the metals, oxides and sulfides and said hydrocarbon is contacted with said catalyst at a temperature within the range of 500 to 900° F. at a liquid hourly space velocity within the range of about 0.1 to about 10 at a pressure of 1500 to about 3000 p.s.i.g. in the presence of hydrogen added at a rate of about 3000 to about 5000 standard cubic feet per barrel of said hydrocarbon.

13. The method of claim 10 wherein said siliceous base is selected from crystalline and amorphous silicas, silica-alumina combinations and aluminosilicates, said catalyst comprises at least one hydrogenation component selected from the Group VI and VIII metals, oxides and sulfides, said acidified alumina consists essentially of boehmite alumina acidified with about 0.5 to about 1 equivalent per mole of said alumina of at least one acidic agent selected from hydrochloric acid, nitric acid, perchloric acid, aluminum nitrate, aluminum chlorides, zirconyl chlorides, chromic chloride and ferric chloride and contains less than about 5 weight-percent on a dry weight basis of bayerite alumina, and the resultant combination of said siliceous base and said acidified alumina is thermally activated prior to contacting with said hydrocarbons, and said hydrocarbons are contacted with said catalyst at a temperature within the range of 500 to 900° F. at a liquid hourly space velocity within the range of about 0.3 to about 5 at a pressure of 1500 to about 3000 p.s.i.g. in the presence of hydrogen added at a rate of about 3000 to about 5000 standard cubic feet per barrel of said hydrocarbon.

14. The method of hydrofining hydrocarbons boiling above about 200° F. and containing at least one of organonitrogen and organosulfur compounds which comprises contacting said hydrocarbons under hydrofining conditions sufficient to substantially reduce the organonitrogen content of said hydrocarbons with a catalyst comprising a siliceous base having combined therewith at least one of the metals, oxides and sulfides or iron, cobalt, nickel, platinum, palladium, molybdenum and tungsten and about 5 to about 80 weight-percent of an acidified boehmite alumina binder, said boehmite alumina binder having been acidified with at least 0.5 equivalent per mole of said alumina of a strong mineral acid having a monovalent anion over an acidic salt thereof prior to combination with said siliceous base.

15. The method of claim 14 wherein said siliceous base is selected from crystalline and amorphous silicas, silica-alumina admixtures and aluminosilicates, said boehmite alumina consists of less than about 5 weight-percent bayerite on a dry weight basis and is prepared by acidifying hydrous boehmite alumina with about 0.5 to about 2 equivalents per mole of said alumina of at least one of nitric acid, hydrochloric acid, perchloric acid, aluminum nitrate, aluminum chloride, zirconyl chloride, chromic chloride and ferric chloride, the concentration of said binder in said catalyst is within the range of about 10 to about 50 weight-percent on a dry weight basis and said hydrocarbon is contacted with said catalyst at a temperature within the range of 500 to 800° F. at a liquid hourly space velocity within the range of about 0.5 to about 10 at a pressure within the range of 500 to 2000 p.s.i.g. in the presence of hydrogen added at the rate of at least about 500 standard cubic feet per barrel of said hydrocarbon.

16. The method of claim 14 wherein said catalyst comprises catalytically active amounts of nickel and molybdenum in the form of at least one of the metals, oxides and sulfides and said hydrocarbon is contacted with said catalyst at a temperature within the range of 500 to 800° F. at a liquid hourly space velocity within the range of about 0.5 to about 10 at a pressure of 500 to about 2000 p.s.i.g. in the presence of hydrogen added at a rate of about 1000 to about 10,000 standard cubic feet per barrel of said hydrocarbon.

17. The method of claim 14 wherein said siliceous base is selected from crystalline and amorphous silicas, silica-alumina combinations and aluminosilicates, said catalyst comprises at least one hydrogenation component selected from the Group VI and VIII metals, oxides and sulfides, said acidified alumina consists essentially of boehmite alumina acidified with about 0.5 to about 1 equivalent per mole of said alumina of at least one acidic agent selected from hydrochloric acid, nitric acid, perchloric acid, aluminum nitrate, aluminum chlorides, zirconyl chlorides, chromic chloride and ferric chloride and contains less than about 5 weight-percent on a dry weight basis of bayerite alumina, and the resultant combination of said siliceous base and said acidified alumina is thermally activated prior to contacting with said hydrocarbons, and said hydrocarbons are contacted with said catalyst at a temperature within the range of about 500 to 800° F. at a liquid hourly space velocity within the range of about 0.1 to about 5 at a pressure of 500 to about 2000 p.s.i.g. in the presence of hydrogen added at a rate of about 1000 to about 10,000 standard cubic feet per barrel of said hydrocarbon.

References Cited
UNITED STATES PATENTS

| | | | |
|---|---|---|---|
| 3,140,253 | 7/1964 | Plank et al. | 208—120 |
| 3,173,855 | 3/1965 | Miale et al. | 208—120 |
| 3,267,022 | 8/1966 | Hansford | 208—111 |
| 3,393,148 | 7/1968 | Bertolacini et al. | 208—264 |
| 3,558,508 | 1/1971 | Keith et al. | 252—317 |

DELBERT E. GANTZ, Primary Examiner

G. E. SCHMITKONS, Assistant Examiner

U.S. Cl. X.R.

208—120, 143, 216, 264; 252—477